(12) United States Patent
Pop et al.

(10) Patent No.: US 9,472,311 B2
(45) Date of Patent: Oct. 18, 2016

(54) METHOD FOR PREDICTION OF LIGHT WATER REACTOR FUEL DEFECTS USING A FUEL CONDITION INDEX

(71) Applicant: AREVA Inc., Lynchburg, VA (US)

(72) Inventors: Mihai G. M. Pop, Alexandria, VA (US); Brian Glenn Lockamon, Evington, VA (US)

(73) Assignee: AREVA Inc., Lynchburg, VA (US)

( * ) Notice: Subject to any disclaimer, the term of this patent is extended or adjusted under 35 U.S.C. 154(b) by 270 days.

(21) Appl. No.: 14/259,955

(22) Filed: Apr. 23, 2014

(65) Prior Publication Data

US 2016/0268010 A1      Sep. 15, 2016

Related U.S. Application Data

(62) Division of application No. 11/490,959, filed on Jul. 21, 2006, now Pat. No. 8,737,557.

(51) Int. Cl.
*G21C 17/07* (2006.01)
*G21C 7/06* (2006.01)

(52) U.S. Cl.
CPC ...................................... *G21C 7/06* (2013.01)

(58) Field of Classification Search
CPC ................................. G21C 17/00; G01B 7/06
USPC .................................. 376/251; 324/229, 230
See application file for complete search history.

(56) References Cited

U.S. PATENT DOCUMENTS

| 3,762,993 A | 10/1973 | Jones |
| 3,775,245 A | 11/1973 | Delisle et al. |
| 3,878,040 A | 4/1975 | Martucci |
| 3,940,311 A | 2/1976 | Frisch et al. |
| 4,016,749 A | 4/1977 | Wachter |
| 4,147,587 A | 4/1979 | Utamura et al. |
| 4,174,255 A | 11/1979 | Lawrie |
| 4,318,777 A | 3/1982 | Sujumura et al. |

(Continued)

FOREIGN PATENT DOCUMENTS

WO    WO 01/39207    5/2001

OTHER PUBLICATIONS

Reliability: A Practitioner's Guide. Excerpt: chapter 3. 2003. Intellect, the Information Technology Telecommunications and Electronics Association. full text available online: <ftp://ftp.ptc.com/outgoing/Windchill_Quality_Solutions/Practitioner's_Guide.pdf>.*

(Continued)

*Primary Examiner* — Jack W Keith
*Assistant Examiner* — Lily C Garner
(74) *Attorney, Agent, or Firm* — Davidson, Davidson & Kappel, LLC

(57) ABSTRACT

A method to assess light water reactor fuel integrity is presented having the steps of granting access in a nuclear reactor fuel pool to at least one of a discharged fuel rod and a nuclear fuel assembly, calculating an operating flux for the fuel rod, measuring a thickness of CRUD on the fuel rod, measuring a thickness of oxide on the fuel rod, calculating a maximized flux for the at least one fuel rod for a position of the one fuel rod in a nuclear reactor, calculating a maximized deposit for the fuel rod, calculating a maximized oxide thickness for the fuel rod, calculating a fuel condition index of the fuel rod, comparing the fuel condition index to an index constant, and removing the fuel rod from operation when the fuel condition index is greater than the index constant.

10 Claims, 5 Drawing Sheets

(56) References Cited

U.S. PATENT DOCUMENTS

| | | |
|---|---|---|
| 4,326,122 A | 4/1982 | McCulloch et al. |
| 4,416,847 A | 11/1983 | Saito et al. |
| 4,517,153 A | 5/1985 | Plaziaud |
| 4,581,196 A | 4/1986 | Sakagami et al. |
| 4,582,671 A | 4/1986 | Rindo |
| 4,689,193 A | 8/1987 | Van Swam et al. |
| 4,696,788 A | 9/1987 | Seli |
| 4,764,335 A | 8/1988 | Gross et al. |
| 5,171,517 A | 12/1992 | Solomon et al. |
| 5,307,385 A | 4/1994 | Shimanuki et al. |
| 5,383,226 A | 1/1995 | Deleryd et al. |
| 5,414,742 A | 5/1995 | Hornak et al. |
| 5,457,994 A | 10/1995 | Kwun et al. |
| 5,544,208 A | 8/1996 | Pao et al. |
| 5,682,409 A | 10/1997 | Caine |
| 6,345,081 B1 | 2/2002 | Sihver et al. |
| 6,345,082 B1 | 2/2002 | Galioto et al. |
| 6,366,083 B1 | 4/2002 | McClelland |
| 6,369,566 B1 * | 4/2002 | McClelland ......... G21C 17/06 324/229 |
| 6,396,892 B1 | 5/2002 | Frattini et al. |
| 6,493,413 B1 | 12/2002 | Galioto et al. |
| 6,674,825 B2 | 1/2004 | Bolger et al. |
| 6,876,195 B2 | 4/2005 | Pigelet et al. |
| 6,891,912 B1 | 5/2005 | Lukic et al. |
| 7,031,779 B2 | 4/2006 | Horn et al. |
| 7,139,355 B2 | 11/2006 | McFetridge |
| 7,304,301 B1 | 12/2007 | Pop et al. |
| 2004/0071253 A1 | 4/2004 | McFetridge |
| 2006/0129362 A1 | 6/2006 | Mahe et al. |
| 2006/0146973 A1 * | 7/2006 | Yeager ................ G21C 17/00 376/251 |

OTHER PUBLICATIONS

PCT International Search Report from PCT/US07/12334 mailed on Oct. 6, 2008.
Pop et al., "Areva NP Fuel Condition Index for Boiling Water Reactor", International 2007 LWR Fuel Performance Meeting, San Francisco, CA 2007.
Lee et al., "Failure Probability Estimation of Pressure Tube Using Failure Assessment Diagram", Solid State Phenomena, V. 120, pp. 37-42, 2007.
Design and Construction Rules for Fuel Assemblies of PWR Nuclear Power Plants, AFCEN 2005.
The American Heritage College Dictionary, 3rd ed., 1993, p. 525.
S.R. de Groot and P. Mazur, "Non-Equilibrium Thermodynamics", Dover Publications, Inc., New York (1984) (first published 1962 by North-Holland Pub. Co, Chapter 2, pp. 17-19 (par. 4, "Conservation of Energy"). ISBN: 0-486-64741-2.
NRC Information Notice 97, Nuclear Regulatory Commission, Washington D.C., Dec. 11, 1997.
Standard Technical Specifications Westinghouse Plants, Bases, Rev. 3.0, pp. B 3.2.1A-1 through B 3.2.1A-3, NRC, Washington D.C. (Jun. 2004).
Standard Technical Specifications, Westinghouse Plants, Bases, Rev. 31., pp. B 3.5.2-1 through B 3.5.2-3, NRC, Washington D.C. (Dec. 1, 2005).

* cited by examiner

METHOD FOR PREDICTION OF LIGHT WATER REACTOR FUEL DEFECTS USING A FUEL CONDITION INDEX

This application is a divisional of U.S. patent application Ser. No. 11/490,959, filed on Jul. 21, 2006, which is incorporated herein by reference in its entirety.

FIELD OF THE INVENTION

The present invention relates to Light Water Reactor (LWR) fuel assemblies. More specifically, the present invention provides a methodology to assess through an index the condition of nuclear reactor fuel rods and assemblies for LWR plants after a given time of operation under a given heat and neutronic flux and a given water chemistry.

BACKGROUND INFORMATION

Light Water Reactor fuel integrity is a critical part of overall nuclear reactor safety. The structural integrity of the fuel constitutes a primary barrier to fission product release to the environment, consequently, compromising the structural integrity of the fuel during a fuel cycle is avoided. Compromising the integrity of the fuel (i.e. failure of fuel rods), is avoided by a number of measures taken by the fuel manufacturer or/and operator such as performing refueling outage visual inspections on the fuel rods with underwater equipment, changing the fuel rods, etc. Fuel rods are also tracked as to their respective position and core residence time such that when a fuel rod has a defined amount of depleted fuel, the affected fuel assembly is removed from further reactor operation.

Although best efforts are used to predict fuel rod failure there has been no accurate methodology for prediction of fuel rod failure based upon operating characteristics. Factors such as the extent of use of the fuel rod or the chemistry of reactor water affect the ability of the fuel rod to withstand structural loadings on the rods. Modification of the usage (i.e. using the fuel rod in another position of the reactor) further increases the variability of the fuel rod failure potential. To avoid undesired consequences of fuel rod failure, nuclear plant operators always decide on discharging fuel elements at an earlier time that may present signs of future damage. That decreases economic efficiency for the nuclear power plant.

There is also a need to provide a method to predict fuel rod failure in nuclear fuel assemblies.

There is also a further need to provide a methodology to assess fuel rod integrity during the lifetime of the fuel at a specific point in time, such as during a refueling outage.

SUMMARY

It is therefore an objective of the present invention to provide a methodology to assess the significance of plant changes/alterations on fuel rod integrity.

It is also a further objective of the present invention to provide a methodology to assess fuel rod integrity during the lifetime of the fuel at a specific point in time, such as during a refueling outage.

The objectives of the present invention are achieved as illustrated and described. The present invention provides a method to assess light water reactor fuel integrity, having the steps of granting access in a nuclear reactor fuel pool to at least one of a discharged fuel rod and a nuclear fuel assembly, calculating an operating flux for the at least one fuel rod and the nuclear fuel assembly, measuring a thickness of CRUD on the at least one of the fuel rod and the nuclear fuel assembly, measuring a thickness of oxide on the at least one fuel rod and the nuclear fuel assembly, calculating a maximized flux for the at least one fuel rod and the nuclear fuel assembly for a position of the at least one fuel rod and the nuclear fuel assembly in a nuclear reactor, calculating a maximized deposit for the at least one fuel rod and the nuclear fuel assembly in the nuclear reactor, calculating a maximized oxide thickness for the at least one fuel rod and the nuclear fuel assembly in the nuclear reactor, calculating a fuel condition index of the at least one of the fuel rod and the nuclear fuel assembly, comparing the fuel condition index to an index constant, and removing the at least one of the fuel rod and the nuclear fuel assembly from operation when the fuel condition index is greater than the index constant.

The method may also be performed wherein the fuel condition index is calculated as $$\left(\frac{OperatingFlux}{MaximFlux} + \frac{OperatingDeposit}{MaximDeposit} + \frac{OperatingOxideThickness}{MaximOxideThickness}\right) \leq A$$

where A is the index constant.

The index constant may have any value lower or equal to 3.0, as a function of the margin considered. For a safety margin of 20%, the index constant is 2.4.

The method may also be accomplished such that the fuel condition index is calculated with correction factors, wherein $$\left[\left(\frac{\text{Peak Assy Flux}}{\text{Maximum Flux}}\right)B + \left(\frac{\text{Operating Deposit}}{\text{Maximum Deposit}}\right)C + \left(\frac{\text{Operating Oxide Thickness}}{\text{Maximum Oxide Thickness}}\right)D\right] = FCI$$

and $$\left[\left(\frac{\text{Peak Assy Flux}}{\text{Maximum Flux}}\right)B + \text{Deposit Factor} + \left(\frac{\text{Operating Oxide Thickness}}{\text{Maximum Oxide Thickness}}\right)D\right] = FCI$$

Where B, C and D are flow, crud and fuel design adjustment factors with values between 0.3 to 1.4 and FCI is the fuel condition index.

The application of the fuel condition index may be performed on either boiling water reactor or pressurized water reactor fuel.

DETAILED DESCRIPTION

Figure 1:
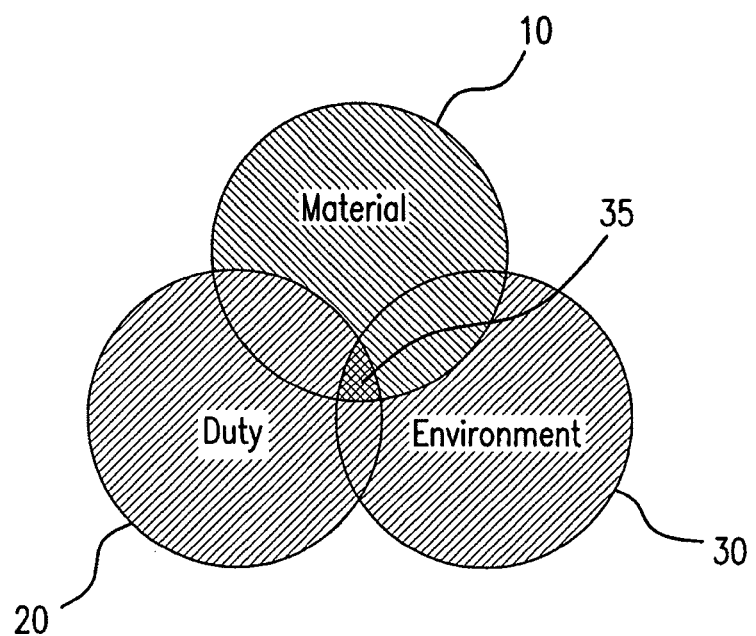
FIG. 1 is a Venn diagram of contributing factors to Light Water Reactor fuel failures.

Referring to FIG. 1, a Venn diagram describing the factors that affect overall fuel integrity of a LWR plant is provided. Three different interrelated factors are used in the methodology of the present invention to determine the likelihood of an integrity breach of fuel rods for a light water nuclear reactor. The material condition 10 of individual fuel rods is used in conjunction with both the duty (amount of use) of the fuel rods 20 and the environment 30 that the fuel rods will or have experienced to determine the overall likelihood of an integrity breach of the fuel rod or assembly in question. In the triple overlap region 35 of the material 10, duty 20 and environment 30, the potential exists for compromised light water reactor fuel rods. In non-triple overlap regions in the Venn diagram, the likelihood of structurally compromised light water reactor fuel rods is minimal as the simultaneous occurrence of all of the factors entering a critical region does not occur.

Figure 2:
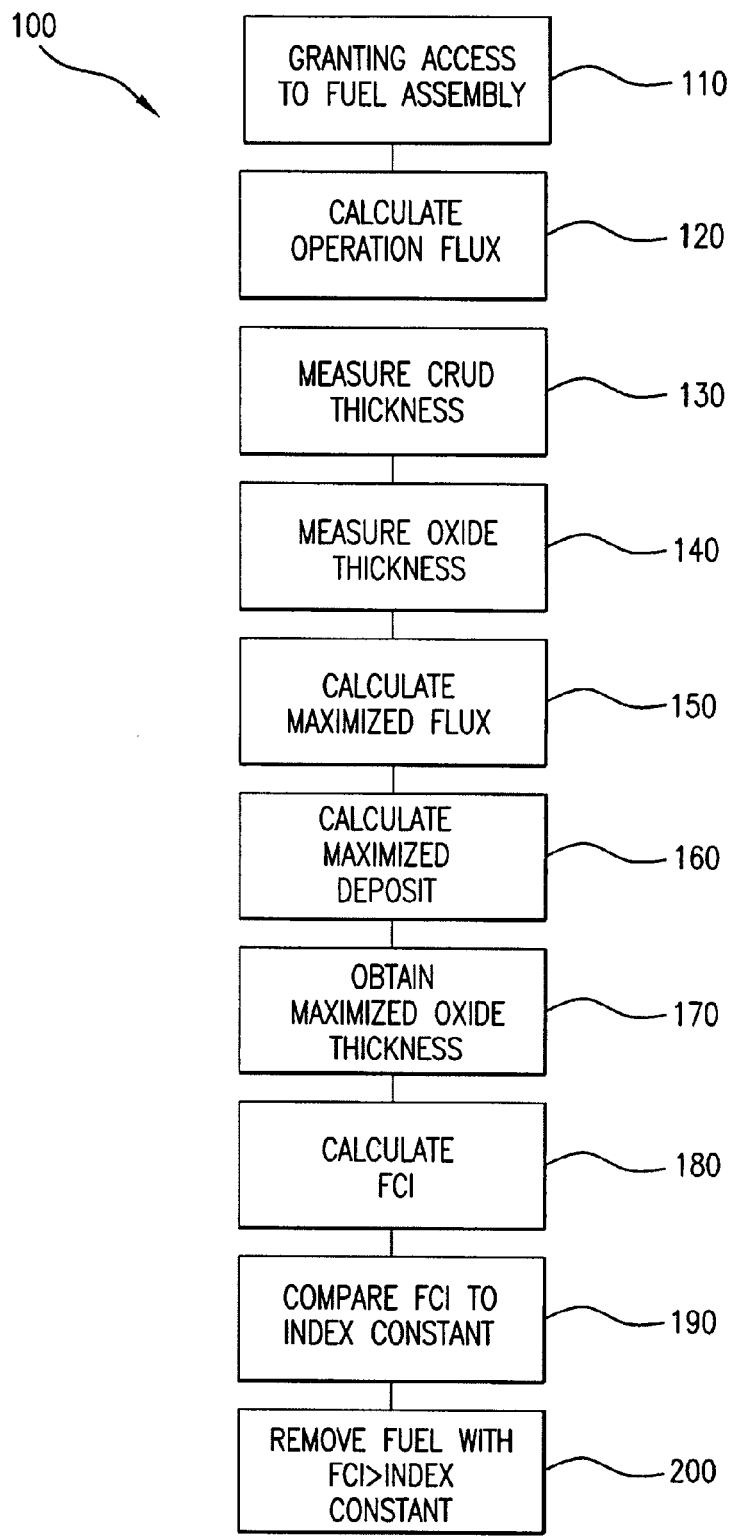
FIG. 2 is a flow chart of a method for prediction of fuel rod failure and assessment of fuel rod integrity.

Referring to FIG. 2, a method 100 according to the present invention allows for identification of light water reactor fuel rods that have, or that will have a high risk of structural integrity problems during an upcoming fuel cycle or at the time of evaluation. The methodology 100 calculates a fuel condition index 180 that is a measure of the portion of fuel element endurance expended during realistic operating conditions in a most thermally stressed region of the fuel element.

The present methodology 100 uses the factors of heat flux of a nuclear fuel rod, the thickness of a CRUD on a surface of the fuel rod and the oxide thickness of the fuel rod as obtained from the three factors of environment 30, duty 20 and material 10 for the factors described above.

The factors of heat flux of a nuclear fuel rod, the thickness of the CRUD on the surface of the fuel rod and the oxide thickness of the fuel rod are used to determine the likelihood of the fuel rod integrity being compromised as these factors are interrelated. Specifically, the heat flux for a fuel rod affects both the thickness of CRUD on the fuel rod as well as the oxide thickness of the fuel rod.

Changes in CRUD properties on a fuel rod (for instance an increase in thickness of the CRUD layer) results in a change in heat flux as well as oxide composition on the fuel rod. The quantification of a fuel condition index 180 allows a fuel rod to be evaluated at a specific point in time, including times throughout a full fuel cycle.

The factors of flux of the nuclear fuel rod, the thickness of the CRUD on the surface of the fuel rod and the oxide thickness of the fuel rod are used to determine the likelihood of a fuel rod integrity breach in the methodology of the present invention. Adjustment factors include, for example, the effect of sequence exchange interval, CRUD maturity and feedwater chemistry.

The fuel condition index, therefore, as a time dependent variable, is expressed as:

$$\left(\frac{OperatingFlux}{MaximFlux} + \frac{OperatingDeposit}{MaximDeposit} + \frac{OperatingOxideThickness}{MaximOxideThickness}\right) \leq A \quad (1)$$

As provided in the above equation (1), if the operating flux encountered by the individual fuel rod is equivalent to the maximum possible flux for that rod, the operating deposit (CRUD deposit) is equivalent to the maximum deposit of CRUD for the rod and the measured operating oxide thickness for the fuel element is equivalent to the maximum oxide thickness possible for the element, the value of the fuel condition index constant (A) is three (3).

Using the above factors, the fuel condition index 180 is used to indicate at any given moment within a life span of the fuel element the likelihood of an integrity breach of the fuel rod in that the closer the calculated value is to the value 3, the closer the fuel in question is to failure.

In an alternative exemplary embodiment of the methodology of the present invention, the fuel condition index 180, is defined to incorporate a factor of safety to ensure the continued integrity of fuel rods in the reactor. To this end, a margin of 20%, for instance, is chosen, thereby allowing the fuel condition index to be calculated as:

$$\left(\frac{OperatingFlux}{MaximFlux} + \frac{OperatingDeposit}{MaximDeposit} + \frac{OperatingOxideThickness}{MaximOxideThickness}\right) \leq 2.4 \quad (2)$$

In the equations presented above, the effect of time is considered, wherein the maximum flux is considered at a time that is different from the operating time (moment) of interest. When the operating time for the operating components is the same for all three terms of the equations, the maximum flux, maximum deposit and the maximum oxide thickness are obtained all at different moments from the beginning of operation or, if historic fuel data is used, throughout the life of the fuel element. Thus, at each operating point, a different value of the fuel condition index is achieved. Several fuel condition index calculations may be performed to study a trend for the fuel rod or assembly in question. The fuel condition index may also be graphed over time to determine the maximum fuel condition index value for a specific fuel rod or assembly. This data can be used to determine if the fuel rod or assembly should be removed from service.

The asynchronos time of maximum values of the three elements contributing to the fuel index is a characteristic of the light water reactor fuel condition index 180 and is therefore useful to not only ascertain the current condition of fuel elements (rods) in a reactor, but to also predict for a next fuel cycle, the integrity of those fuel elements.

Considering the effect of time explicitly, the equation above becomes:

$$\sum_{i=1}^{m}\left(\frac{OperatingHeatFlux_i}{m \times MaximumHeatFlux} + \frac{OperatingDeposit_i}{m \times MaximumDeposit} + \frac{OperatingOxideThickness_i}{m \times MaximumOxideThickness}\right) \leq 2.4 \quad (3)$$

The values obtained in equation three (3) above are averaged for the life of the deposition. Considering m=total number of months the fuel element was kept in the reactor, then the operating values correspond to each month of operation.

The averaging, as presented in equation (3), produces a value for the fuel condition index that is less conservative than the value of the fuel condition index in equation (2).

In the methodology of the present invention, adjustment factors are combined with the base terms in Equation 3, to form the following integrated condition model (at a given moment in time):

$$\left[\left(\frac{\text{Peak Assy Flux}}{\text{Maximum Flux}}\right)B + \left(\frac{\text{Operating Deposit}}{\text{Maximum Deposit}}\right)C + \left(\frac{\text{Operating Oxide Thickness}}{\text{Maximum Oxide Thickness}}\right)D\right] = FCI \quad (4)$$

Wherein the adjustment factors are:
  B=Flow Adjustment Factor
  C=Crud Adjustment Factor, including chemistry of the deposit
  D=Fuel Design Adjustment Factor
  FCI=Fuel Condition Indes Based on calculations and confirmed by comparison with real plant data, factors B, C and D have values between 0.3 and 1.4.

A selection of adjustment factors is performed to allow identification of the weight of the individual factors to determine the more significant factors in terms of their individual impact on fuel integrity.

The selection of the weight of the various adjustment factors is performed to maintain a balanced index wherein real world conditions are identified and evaluated. For this reason, the average of all the individual adjustment factors is used to modify the base factors. Each term of the model has a maximum value of 1.2 and a practical minimum value of 0.64 (for a plant with 20% margin). As a result, the fuel condition index for most nuclear plants will fall between 1.9 and 3.6.

As obtained through testing of actual fuel elements in nuclear power reactors, nuclear reactor facilities are divided into High, Medium, and Low Risk cycle plants by dividing the expected range of the fuel condition index (1.9-3.6) into thirds to provide index constants. This result produces the following classifications:
  FCI≥3.0=High Risk Condition
  FCI 2.4-2.9=Medium Risk Condition
  FCI<2.4=Low Risk Condition The FCI may be used, but not limited to, conducting a preliminary assessment of operational conditions on fuel (changes, sequence exchange, water chemistry, etc.) prior to (or without) detailed analysis. The fuel condition index may also estimate risks associated with supplying fuel to a plant where there is no previous operating experience. The fuel condition index may also be used to estimate warranty risks for fuel manufacturers associated with operational excursions or if a change operation is needed during a reactor fuel cycle.

According to an alternative embodiment of the present invention, the fuel condition index 180 is determined for a plant that has no data on CRUD deposit thickness or morphology by replacing the second term in the Fuel Condition Index calculation with a Deposit Factor based on visual examination of the fuel assemblies as provided in equation 5 below.

$$\left[\left(\frac{\text{Peak Assy Flux}}{\text{Maximum Flux}}\right)B + \text{Deposit Factor} + \left(\frac{\text{Operating Oxide Thickness}}{\text{Maximum Oxide Thickness}}\right)D\right] = FCI \quad (5)$$

Figure 3:
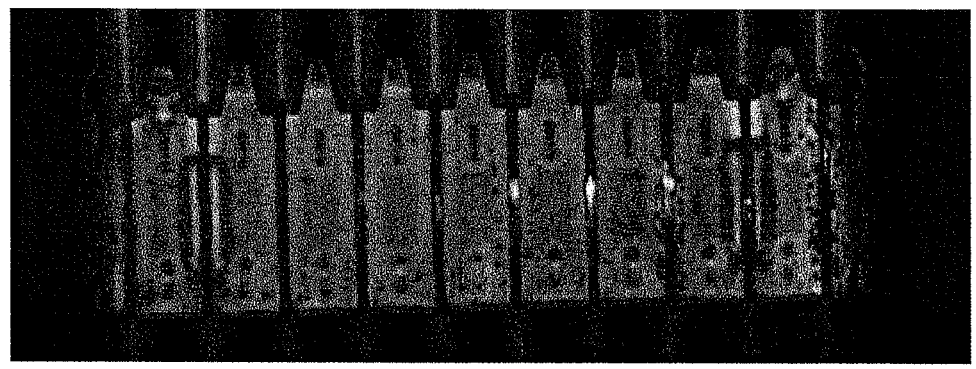
FIG. 3 is a representation of a low deposit factor material placed upon a fuel pin/spacer grid interface.
Figure 4:
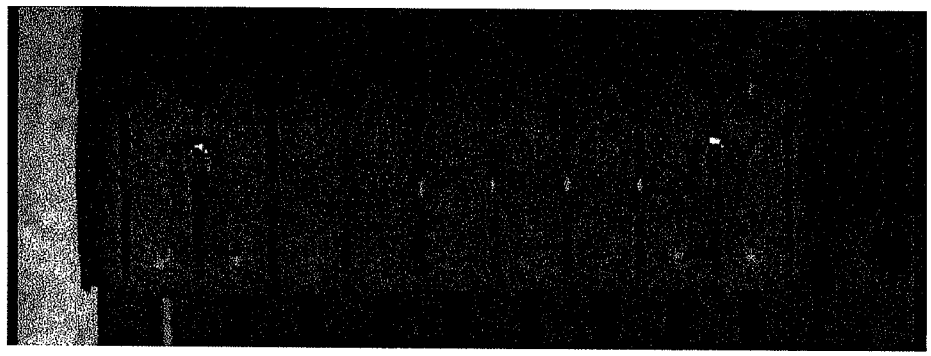
FIG. 4 is a representation of a moderate deposit material placed upon a fuel pin/spacer grid interface.
Figure 5:
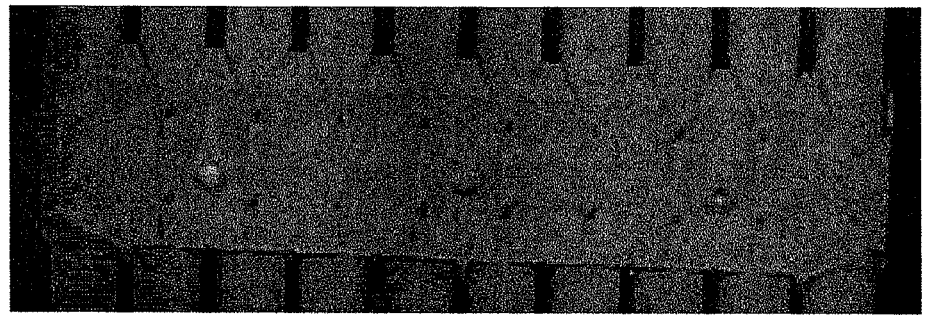
FIG. 5 is a representation of a heavily deposited material placed upon a fuel pin/spacer grid interface.

The value of the deposit factor presented in equation 5 is dependent upon the design of the reactor element to be evaluated and the amount of CRUD placed upon the element. As provided in FIG. 3, a low amount of CRUD attaching to the fuel pins and not a spacer grid is assigned, for example, a value of 0.6. As illustrated in FIG. 4, CRUD that covers the entire fuel pin surface with some limited CRUD on the spacer grid is assigned, for example, a value of 0.8. As illustrated in FIG. 5, a heavily CRUD encrusted assembly with substantial material placed upon the fuel pin and the spacer grid is assigned for instance, a value of 1.2.

Operationally, as provided in FIG. 2, the method 100 to assess boiling water reactor fuel integrity, is accomplished by granting access in a nuclear reactor fuel pool to at least one of a discharged fuel rod and a nuclear fuel assembly 110. The at least one fuel rod or nuclear fuel assembly may be a new rod/fuel assembly or a rod/assembly that was previously in use in a reactor. If the fuel rod or the nuclear fuel assembly were previously used, the rod/assembly is segregated from other heating surfaces of the reactor for further processing as described below. If a nuclear fuel assembly is used, the assembly in total may be evaluated, or individual component pieces may be evaluated.

The overall intended position of the rod or assembly in the nuclear reactor is then determined/chosen by reactor engineers. Based upon the anticipated (or actual) position of the fuel rod/fuel assembly in the reactor, an operating flux of the fuel rod or fuel assembly is then calculated 120.

While the rod or nuclear fuel assembly is segregated, a thickness of CRUD on the at least one of the fuel rod and the nuclear fuel assembly is then measured 130. The measurement is obtained, for example, by scraping the outside of the at least one fuel rod or the nuclear fuel assembly and measuring the thickness of the resulting scrapings in a laboratory in the exemplary methodology described. The measurement can also be obtained through non-destructive examination (e.g. ECT—Eddy current technique).

In addition to measuring the thickness of CRUD of the at least one of the fuel rod and the nuclear fuel assembly, a thickness of oxide on the at least one fuel rod and the nuclear fuel assembly is also measured 140 through ECT or through destructive examination in a hot cell.

Based upon the anticipated location inside the reactor, a maximized flux for the at least one fuel rod and the nuclear fuel assembly for the specific position of the at least one fuel rod and the nuclear fuel assembly in a nuclear reactor is calculated 150. The maximized flux is calculated along the most thermally stressed portion of the rod or assembly.

A maximized deposit that may be achieved for the at least one fuel rod and the nuclear fuel assembly in the nuclear reactor is then calculated 160. The maximized deposit is determined through selection from the data base of the worst known deposition at which the fuel survived through its life. The length of time chosen may be an instantaneous time or an evaluation may take place over a length of a fuel cycle.

A maximized oxide thickness that may be achieved during the time frame in question for the at least one fuel rod and the nuclear fuel assembly in the nuclear reactor is obtained 170 as the smaller value between the worst measured oxide thickness at the end of life of the fuel element and the regulatory admitted maximum oxide thickness. The length of time chosen may be an instantaneous time or an evaluation may occur over a length of the fuel cycle.

Next, the fuel condition index of the at least one of the fuel rod and the nuclear fuel assembly is then calculated 180. The calculated fuel condition index is then compared to an index constant 190.

Lastly, the at least one of the fuel rod and the nuclear fuel assembly is removed from operation 200 when the fuel condition index is greater than an index constant identified as identifying a high risk condition.

The present invention provides a methodology that allows quantification of high risk fuel rods/fuel assemblies. The evaluative methodology improves on the existing methods by greatly reducing the probability of leaking fuel. The evaluative methodology also minimizes potential for degradation of reactor water clean up systems.

The method according to the present invention also allows for prediction of fuel rod/assembly leakage for future times, different than current visual investigative technologies that have no such capability.

The methodology also allows nuclear plant operators to satisfy the requirements of regulatory agencies that require nuclear power plant operators to develop overlapping credible methods to assess fuel rod integrity in light of plant changes conducted during operation.

In the foregoing specification, the invention has been described with reference to specific exemplary embodiments thereof. It will, however, be evident that various modifications and changes may be made thereunto without departing from the broader spirit and scope of the invention as set forth in the appended claims. The specification and drawings are accordingly to be regarded in an illustrative rather than in a restrictive sense.

What is claimed is:

1. A method to assess light water reactor fuel integrity after a given time of operation of the light water reactor, the method comprising:
   granting access in a nuclear reactor fuel pool to at least one of a discharged fuel rod and a discharged nuclear fuel assembly, wherein the at least one discharged fuel rod or discharged nuclear fuel assembly experienced a heat flux;
   determining the heat flux experienced by the at least one discharged fuel rod or discharged nuclear fuel assembly;
   measuring a thickness of oxide on the at least one discharged fuel rod or discharged nuclear fuel assembly;
   determining a maximum possible heat flux for the at least one discharged fuel rod or discharged nuclear fuel assembly for a position of the at least one discharged fuel rod or discharged nuclear fuel assembly in the light water reactor on a life of the nuclear fuel assembly;
   determining a Deposit Factor for CRUD on the at least one discharged fuel rod or discharged nuclear fuel assembly, the Deposit Factor being a value that increases with an amount of CRUD on the at least one discharged fuel rod or discharged nuclear fuel assembly;
   determining a maximum possible oxide thickness for the at least one discharged fuel rod or discharged nuclear fuel assembly in the light water reactor;
   calculating a fuel condition index of the at least one discharged fuel rod or discharged nuclear fuel assembly in a calculation comprising calculating a ratio of the experienced heat flux to the maximum possible heat flux, and calculating a ratio of the measured oxide thickness to the maximum possible oxide thickness, the fuel condition index being based on the ratio of the experienced heat flux to the maximum possible heat flux, the ratio of the measured oxide thickness to the maximum possible oxide thickness and the value of the Deposit Factor;
   comparing the fuel condition index to an index constant; and
   removing the at least one of the discharged fuel rod and the discharged nuclear fuel assembly from operation when the fuel condition index is greater than the index constant.

2. The method according to claim 1, wherein the fuel condition index is calculated as:

$$\left[\left(\frac{\text{Peak Assy Flux}}{\text{Maximum Flux}}\right)B + \text{Deposit Factor} + \left(\frac{\text{Operating Oxide Thickness}}{\text{Maximum Oxide Thickness}}\right)D\right] = FCI$$

where B is a flow adjustment factor, D is a fuel design adjustment factor,
FCI is the fuel condition index,
Peak Assy Flux is the experienced peak operating heat flux,
Maximum Flux is the maximum possible heat flux,
Operating Oxide Thickness is the measured oxide thickness,
Maximum Oxide Thickness is the maximum possible oxide thickness, and
Deposit Factor is the value of the Deposit Factor.

3. The method according to claim 2, wherein the flow adjustment factor and the fuel design adjustment factor each have values between 0.3 to 1.4.

4. The method according to claim 1, wherein the index constant has a value determined as a function of a size of a safety margin, the safety margin being a percentage that with an increasing value decreases the value of the index constant.

5. The method according to claim 4, wherein the index constant has a value of 3.0 when the value of the safety margin is 0%.

6. The method according to claim 1, wherein the light water reactor is identified as being high, medium or low risk based on the calculated fuel condition index, a value above a first threshold indicating a high risk, a value below the first threshold and above a second threshold that is lower than the first threshold indicating a medium risk and value below the second threshold indicating a low risk.

7. The method according to claim 1, wherein the light water reactor is one of a boiling water reactor and a pressurized water reactor.

8. The method according to claim 1, wherein determining the Deposit Factor includes visually examining the amount of CRUD on the at least one discharged fuel rod or discharged nuclear fuel assembly.

9. The method according to claim 8, wherein determining the Deposit Factor includes determining the Deposit Factor for CRUD on the discharged nuclear fuel assembly, the determining the Deposit Factor including comparing amounts of CRUD deposited on at least two different components of the discharged nuclear fuel assembly.

10. The method according to claim 9, wherein the at least two different components include a fuel rod of the discharged nuclear fuel assembly and a spacer grid of the discharged nuclear fuel assembly.

* * * * *